(12) United States Patent
Mizuno et al.

(10) Patent No.: US 12,673,392 B2
(45) Date of Patent: Jul. 7, 2026

(54) MACHINE TOOL AND PROTECTIVE MEMBER

(71) Applicant: BROTHER KOGYO KABUSHIKI KAISHA, Nagoya (JP)

(72) Inventors: Naoto Mizuno, Kariya (JP); Nobuaki Ishibashi, Nagoya (JP); Shunsuke Tsuji, Nagoya (JP); Yoshihito Yasui, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/751,322

(22) Filed: Jun. 23, 2024

(65) Prior Publication Data

US 2024/0342847 A1 Oct. 17, 2024

Related U.S. Application Data

(63) Continuation of application No. PCT/JP2023/006246, filed on Feb. 21, 2023.

(30) Foreign Application Priority Data

Feb. 21, 2022 (JP) ................................ 2022-024629
Sep. 28, 2022 (JP) ................................ 2022-154608

(51) Int. Cl.
*B23Q 11/08* (2006.01)
(52) U.S. Cl.
CPC .................................... *B23Q 11/08* (2013.01)
(58) Field of Classification Search
CPC ............ B23Q 11/08; B23Q 2011/0808; B23Q 11/0816
See application file for complete search history.

(56) References Cited

U.S. PATENT DOCUMENTS 5,624,363 A * 4/1997 Kuriki .................. B23Q 11/085
29/DIG. 56
2016/0333928 A1* 11/2016 Spinner ................... F16C 29/08

FOREIGN PATENT DOCUMENTS

CN 201511246 6/2010
CN 212794190 3/2021
(Continued)

OTHER PUBLICATIONS

Machine translation of JP 2006123045 A, obtained from FIT database (Year: 2006).*

(Continued)

*Primary Examiner* — Thomas C Diaz
(74) *Attorney, Agent, or Firm* — JCIPRNET

(57) ABSTRACT

In the disclosure, a plate-shaped fixing cover (30) is fixed to a lower part of a main shaft head (6). The fixing cover (30) protects a moving mechanism inside a column (5) from chips and the like. When the main shaft head (6) is positioned at an uppermost end of a movement range, a moving cover (40) covers and protects a portion of the column (5) that is exposed and not covered by the fixing cover (30). When the main shaft head (6) moves to the bottom end of the movement range, the moving cover (40) abut against the engagement projections (55A, 55B) and is restricted from moving downward. As the main shaft head (6) descends, the moving cover (40) moves upward relatively with respect to the fixing cover (30) and is housed on a back surface side of the fixing cover (30).

11 Claims, 12 Drawing Sheets

(56)  References Cited

FOREIGN PATENT DOCUMENTS

| JP | 01321140 A | * 12/1989 | ............ B23Q 11/08 |
| JP | 2000288932 | 10/2000 | |
| JP | 2004130437 | 4/2004 | |
| JP | 2006123045 | 5/2006 | |
| JP | 2012245594 | 12/2012 | |
| JP | 2013202742 | 10/2013 | |
| JP | 2018167336 | 11/2018 | |

OTHER PUBLICATIONS

"International Search Report (Form PCT/ISA/210) of PCT/JP2023/006246", mailed on May 16, 2023, with English translation thereof, pp. 1-4.
"International Preliminary Report on Patentability of PCT/JP2023/006246; this report contains the following items: PCT/IB/373, PCT/ISA237(cover sheet), PCT/ISA237(Box No. I), PCT/ISA237(Box No. V)", mailed on Aug. 27, 2024 and May 16, 2023, which is English translation of "Written Opinion of the International Searching Authority", p. 1-p. 7.
"Notice of Reasons for Refusal of Japan Counterpart Application", issued on Nov. 5, 2024, with English translation thereof, p. 1-p. 3.

* cited by examiner

MACHINE TOOL AND PROTECTIVE MEMBER

CROSS-REFERENCE TO RELATED APPLICATION

The present application is a continuation of PCT/JP2023/006246, filed on Feb. 21, 2023, and is related to and claims priority from Japanese patent application no. 2022-024629, filed on Feb. 21, 2022 and Japanese patent application no. 2022-154608, filed on Sep. 28, 2022. The entire contents of the aforementioned application are hereby incorporated by reference herein.

TECHNICAL FIELD

The disclosure relates to a machine tool and a protective member.

RELATED ART

The machine tool described in Patent Document 1 (Japanese Patent Laid-Open No. 2006-123045) has a Z-axis cover fixed to the lower part of the main shaft head. A column is provided on a bed and has a head moving mechanism that moves the main shaft head. The Z-axis cover moves the front surface of the column in the Z-axis direction along with the movement of the main shaft head. The Z-axis cover protects the head moving mechanism from chips.

When the movement range of the main shaft head is expanded, the Z-axis cover needs to be extended in the Z-axis direction. In this case, when the main shaft head is moved to the lowest position in the Z-axis direction, the Z-axis cover may interfere with other structures on the bed. When a bellows-shaped or nested cover is used for the Z-axis cover, the number of parts increases, resulting in a problem that the cost of the machine tool increases.

The disclosure provides a machine tool and a protective member that cover the exposed portion of a moving mechanism provided on a column and are inexpensive.

SUMMARY

According to the first aspect of the disclosure, a machine tool is provided, the machine tool comprises: a base; a column, provided on the base; a main shaft, configured to mount a tool detachably; a support body, provided on one side surface of the column and supporting the main shaft; a moving mechanism, provided on the column and configured to move the support body in an axial direction of the main shaft; and a protective member, covering a portion of the one side surface of the column where the moving mechanism is exposed as the support body moves. The protective member comprises: a first protective part, fixed to the support body and moved in the axial direction along with the support body by the moving mechanism; and a second protective part, moving relatively with respect to the first protective part on a side opposite to the support body of the first protective part.

The first protective part covers a portion of the moving mechanism exposed on one side surface of the column as the support body moves in the axial direction of the main shaft. As the support body moves downward, the first protective part moves closer to the base. When the support body moves upward and the protective member moves away from the base, the first protective part does not completely cover one side surface, and the moving mechanism is exposed. The second protective part moves relatively with respect to the first protective part. The second protective part covers the portion of the moving mechanism that the first protective part does not completely cover and that is exposed. Thus, the first protective part and the second protective part may prevent chips generated during machining of a material by the tool from adhering to the moving mechanism. In addition, the protective member is a structure in which the first protective part is fixed to the support body and the second protective part moves with respect to the first protective part, and thus may be created inexpensively.

In the first aspect, one of the first protective part and the second protective part may have an opening extending in the axial direction, and the other of the first protective part and the second protective part may have a protruding part that protrudes into the opening and is movable in the axial direction relatively with respect to the opening. When the support body moves upward and the protective member moves away from the base, the second protective part moves downward with respect to the first protective part due to its own weight. In this case, the protruding part is guided to the opening, so that the second protective part may reliably move with respect to the first protective part.

The second protective part of the first aspect may have the opening and may be provided closer to the moving mechanism side than the first protective part. That is, the first protective part is located closer to the table side where a material is machined than the second protective part. Thus, the first protective part prevents chips generated when the material is machined by the tool from entering the opening of the second protective part.

The first protective part of the first aspect may have a guiding part that guides a movement of the second protective part in the axial direction. The second protective part may move more reliably in the axial direction of the main shaft with respect to the first protective part by the guide of the guiding part.

The protective member of the first aspect comprises an elastic member that is elastic provided in the protruding part or the opening. When the support body moves upward and the protective member moves away from the base, the second protective part moves downward with respect to the first protective part due to its own weight. The opening of the second protective part move downward with respect to the protruding part of the first protective part. When the protruding part approaches the end part in the axial direction of the opening, the elastic member provided in the protruding part or the opening is sandwiched between the protruding part and the end part of the opening. The elastic member is elastically deformed, and the contact area with the protruding part and the end part of the opening increases. As a result, the elastic member may reduce the stress applied to the first protective part due to the movement of the second protective part by its own weight, and the durability of the second protective part may be increased. In addition, the elastic member may mitigate the impact that would occur when the protruding part and the end part of the opening collide in the case where the elastic member is not present.

The elastic member of the first impact is formed in an annular shape surrounding a periphery of the protruding part. When the elastic member having an annular shape is sandwiched between the protruding part and the end part of the opening, the elastic member may reliably come into contact with the end part and undergo elastic deformation, regardless of the relative positional deviation between the opening and the protruding part or the shape of the end part of the opening. Thus, the elastic member may more reliably mitigate the impact when the first protective part and the second protective part collide.

The protective member of the first aspect may have a spacer provided between the protruding part and the elastic member, and the elastic member may be rotatable in a circumferential direction with respect to the protruding part. By providing the spacer between the elastic member and the protruding part, the elastic member may rotate with respect to the protruding part. When the elastic member is sandwiched between the protruding part and the end part of the opening, the impact applied to the elastic member is not concentrated in a specific portion but is dispersed over the entire circumferential direction as the elastic member rotates. Thus, the elastic member has a longer service life and may mitigate the impact of a collision between the first protective part and the second protective part for a long period of time.

In the first aspect, there may be a third protective part, fixed to the column closer to the base side than the protective member; and engaging parts, provided on the third protective part and engaged with the second protective part when the support body moves in the axial direction to a direction approaching the third protective part, and the engaging parts may be elastic. The third protective part is fixed to the column closer to the base than the protective member, and includes the engaging parts. When the support body descends, the second protective part approaches the base. The second protective part engages the engaging parts without contacting any other structure. The engaging parts come into contact with the second protective part and is elastically deformed, thereby mitigating the impact of a collision.

In the first aspect, a notched part that is notched on a side away from the base and has inclined edges that are inclined with respect to the axial direction in a portion where is notched may be formed at an end part of the second protective part on the base side in the axial direction, and the engaging parts may abut against the inclined edges of the notched part when the support body moves in the axial direction to a direction approaching the third protective part. When the support body descends, the engaging parts abut against the inclined edges of the notched part formed on the second protective part. The inclined edges are inclined with respect to the axial direction. Thus, the drag applied to the second protective part due to the contact with the engaging parts is dispersed in the axial direction and a direction perpendicular to the axial direction. That is, the drag applied to the second protective part in the axial direction when it abuts against the engaging parts is reduced. Thus, the engaging parts may further mitigate the impact applied to the second protective part in the axial direction. Thus, the second protective part may suppress the bouncing movement in the axial direction due to the drag when the inclined edges abut against the engaging parts.

In the first aspect, the first protective part or the second protective part may have projecting parts on any one of a first surface where the first protective part faces the second protective part and a second surface where the second protective part faces the first protective part, and the projecting parts project toward the other surface and have projecting tips that contact the other surface. The projecting part provided on any one of the first surface or the second surface come into contact with the other surface, thereby forming a gap between the first surface and the second surface. That is, the opposing surfaces of the first protective part and the second protective part do not come into direct contact with each other due to the gap formed by the projecting part. Thus, the second protective part is unlikely to adhere to the first protective part, and the relative movement of the second protective part with respect to the first protective part is not hindered.

In the second aspect of the disclosure, there is a protective member for a machine tool, the machine tool comprises: a base; a column, provided on the base; a main shaft, configured to mount a tool detachably; a support body, provided on one side surface of the column and supporting the main shaft; and a moving mechanism, provided on the column and configured to move the support body in an axial direction of the main shaft. The protective member covers and protects a portion of the one side surface of the column of the machine tool where the moving mechanism is exposed as the support body moves, and the protective member comprises: a first protective part, fixed to the support body and moved in the axial direction along with the support body by the moving mechanism; and a second protective part, moving relatively with respect to the first protective part. One of the first protective part and the second protective part may have an opening extending in the axial direction, and the other of the first protective part and the second protective part may have a protruding part that protrudes into the opening and is movable in the axial direction relatively with respect to the opening.

The first protective part covers a portion of the moving mechanism exposed on one side surface of the column as the support body moves in the axial direction of the main shaft. As the support body moves downward, the first protective part moves closer to the base. When the support body moves upward and the protective member moves away from the base, the first protective part does not completely cover one side surface, and the moving mechanism is exposed. The second protective part moves relatively with respect to the first protective part. The second protective part covers the portion of the moving mechanism that the first protective part does not completely cover and that is exposed. Thus, the first protective part and the second protective part may protect the moving mechanism because chips generated during machining of a material by the tool do not adhere to the moving mechanism. In addition, the protective member is a structure in which the first protective part is fixed to the support body and the second protective part moves with respect to the first protective part, and thus may be created inexpensively. Furthermore, when the second protective part moves downward with respect to the first protective part due to its own weight, the protruding part is guided to the opening, so that the second protective part may reliably move in the axial direction with respect to the first protective part.

In the second aspect, an elastic member that is elastic may be provided in the protruding part or the opening. When the second protective part moves to a position below the first protective part due to its own weight, the elastic member is sandwiched between the protruding part and the end part of the opening. The elastic member is elastically deformed, and the contact area with the protruding part and the end part of the opening increases. As a result, the elastic member may reduce the stress applied to the first protective part due to the movement of the second protective part by its own weight, and the durability of the second protective part may be increased. In addition, the elastic member may mitigate the impact that would occur when the protruding part and the end part of the opening collide in the case where the elastic member is not present.

DESCRIPTION OF EMBODIMENTS

Figure 1:
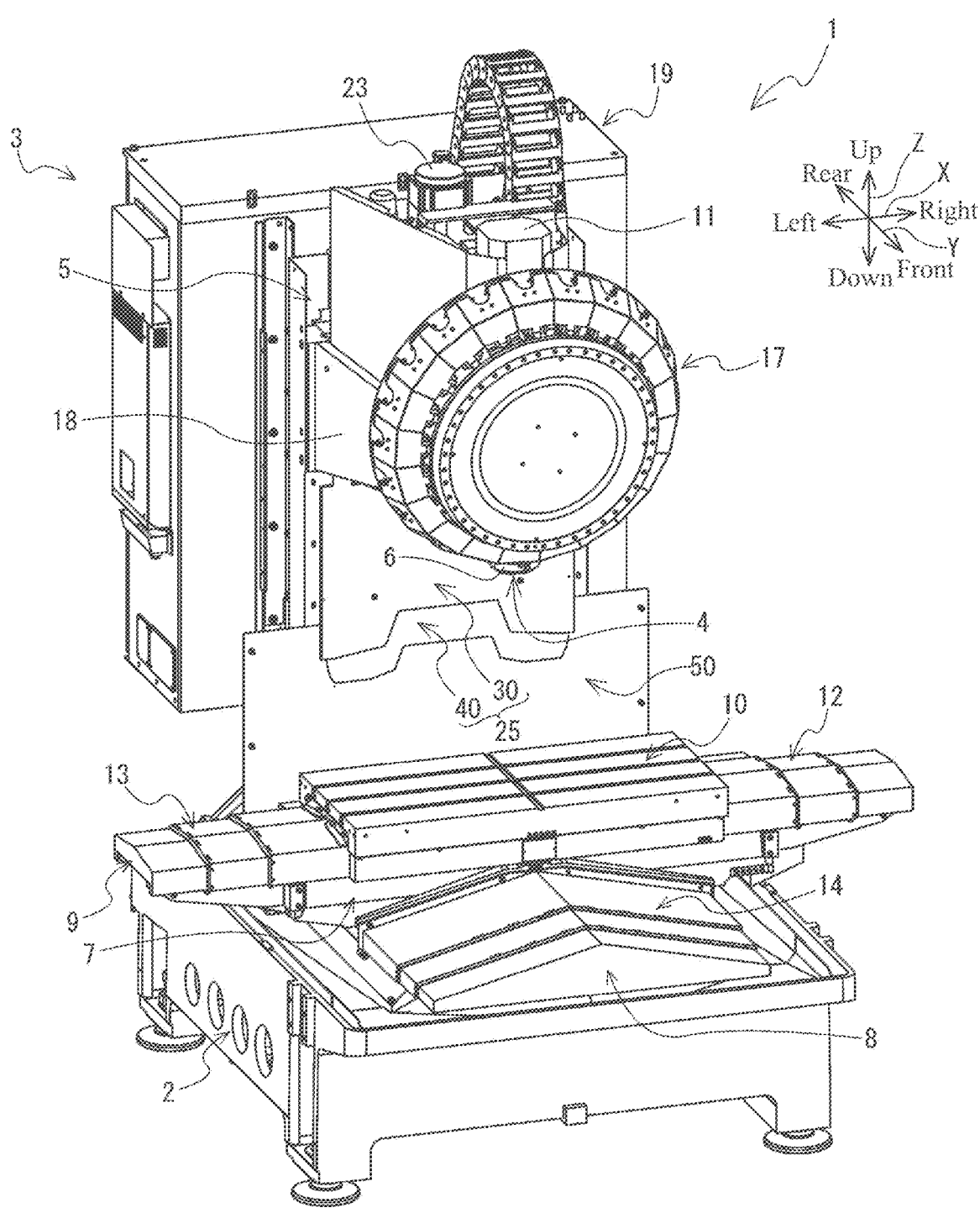
FIG. 1 is a perspective view of the machine tool 1.

The machine tool 1 according to an embodiment of the disclosure will be described. In the following description, left and right, front and rear, and up and down directions indicated by arrows in the drawings will be used. The left and right direction, front and rear direction, and up and down direction are the X-axis direction, Y-axis direction, and Z-axis direction of the machine tool 1, respectively.

Figure 2:
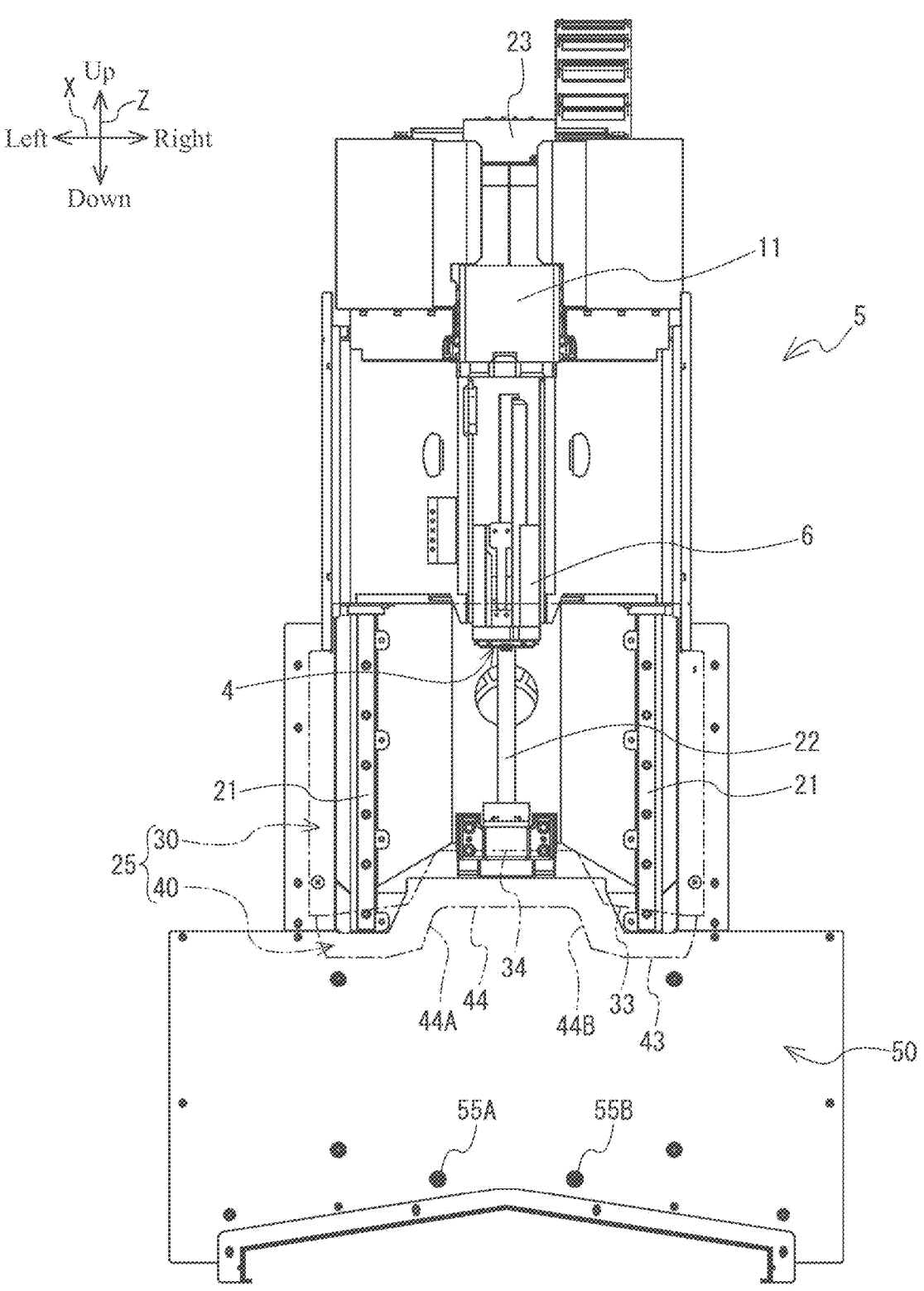
FIG. 2 is a front view of the main shaft head 6 and the column 5 with the protective cover 25 removed.
Figure 3:
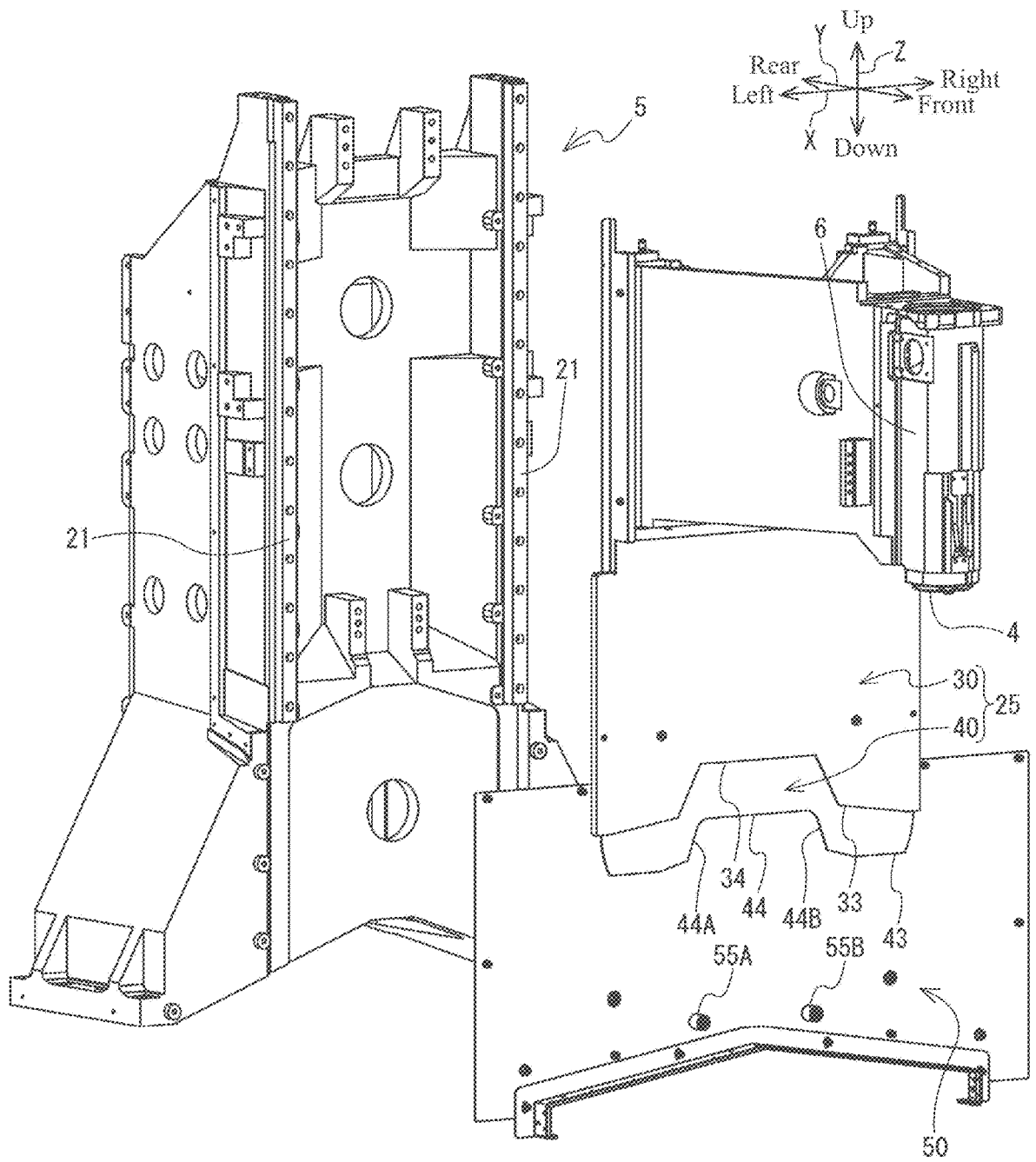
FIG. 3 is an exploded perspective view of the main shaft head 6, the protective cover 25, and the lower cover 50 before being attached to the column 5.

The structure of the machine tool 1 will be described with reference to FIG. 1 to FIG. 3. The machine tool 1 includes a base 2, a machine body 3, a table 10, a tool changing device 17, etc. The base 2 is a substantially rectangular parallelepiped iron sill. The machine body 3 is provided at the upper rear side of the base 2. The machine body 3 cuts a material (not shown) held on the top surface of the table 10. The base 2 has a feed mechanism in the upper center. The feed mechanism moves the table 10 in the X-axis direction and the Y-axis direction. The feed mechanism will be described later. The tool changing device 17 is fixed to a frame 18 provided on the upper part of the column 5 of the machine body 3. The tool changing device 17 exchanges a tool (not shown) mounted to the main shaft 4 of the machine body 3 with another tool.

The machine body 3 includes a column 5, a main shaft head 6, a moving mechanism, a protective cover 25, a lower cover 50, a main shaft 4, a control box 19, etc. The column 5 is an iron column-shaped member located at the upper rear side of the base 2. The main shaft head 6 rises and falls in the Z-axis direction along the front surface of the column 5. The moving mechanism is provided on the front surface of the column 5. The moving mechanism moves the main shaft head 6 in the Z-axis direction. The moving mechanism includes a pair of Z-axis rails 21, a Z-axis ball screw 22, and a Z-axis motor 23. The Z-axis rails 21 and the Z-axis ball screw 22 extend in the Z direction. The main shaft head 6 moves along the Z-axis rails 21. The main shaft head 6 has a nut (not shown) on the rear surface. The nut screws into the Z-axis ball screw 22. The Z-axis motor 23 is provided on the upper part of the Z-axis ball screw 22. The Z-axis motor 23 rotates the Z-axis ball screw 22, moving the nut in the Z-axis direction. Thus, the main shaft head 6 moves in the Z-axis direction along with the nut. The protective cover 25 is fixed to the main shaft head 6 and provided on the front surface of the column 5. The protective cover 25 includes a fixed cover 30 and a moving cover 40. The protective cover 25 will be described later. The lower cover 50 is a metal plate. The lower cover 50 is fixed to the front surface of the column 5 closer to the base 2 side than the protective cover 25. The lower cover 50 protects the column 5 below the Z-axis rails 21. A rear cover device (described later) of the Y-axis feed mechanism 8 is provided at the lower part of the lower cover 50. The rear cover device moves in the Y-axis direction.

The main shaft head 6 rotatably supports the main shaft 4. The main shaft 4 is mounted with a tool and rotates driven by the main shaft motor 11. The main shaft motor 11 is provided on the upper part of the main shaft head 6. The control box 19 is mounted to the rear surface side of the column 5. The control box 19 stores various devices inside. The various devices include, for example, an NC control board, a DC switching power supply, a breaker, an inverter for the tool changing device 17, a wiring duct, a servo amplifier, etc.

The feed mechanism includes a Y-axis feed mechanism 8, a carrier 7, and an X-axis feed mechanism 9. The Y-axis feed mechanism 8 is provided on the top surface of the base 2. The Y-axis feed mechanism 8 moves the carrier 7 in the Y-axis direction. The Y-axis feed mechanism 8 includes a pair of Y-axis rails (not shown), a Y-axis ball screw (not shown), and a Y-axis motor (not shown). The Y-axis rails and the Y-axis ball screw extend in the Y-axis direction. The Y-axis ball screw is provided between the pair of the Y-axis rails. The carrier 7 moves along the Y-axis rails. The carrier 7 has a rectangular parallelepiped shape and is provided with a nut (not shown) on the bottom surface thereof. The nut screws into the Y-axis ball screw. The Y-axis motor rotates the Y-axis ball screw, moving the nut in the Y-axis direction. Thus, the carrier 7 moves in the Y-axis direction along with the nut.

The X-axis feed mechanism 9 is provided on the top surface of the carrier 7. The X-axis feed mechanism 9 moves the table 10 in the X-axis direction. The X-axis feed mechanism 9 includes a pair of X-axis rails (not shown), an X-axis ball screw (not shown), an X-axis motor (not shown), etc. The X-axis rails and the X-axis ball screw extend in the X-axis direction. The X-axis ball screw is provided between the pair of X-axis rails. The table 10 moves along the X-axis rails. The table 10 has a nut (not shown) on the bottom surface. The nut screws into the X-axis ball screw. The X-axis motor rotates the X-axis ball screw, moving the nut in the X-axis direction. Thus, the table 10 moves in the X-axis direction along with the nut. Furthermore, the table 10 moves in the Y-axis direction via the carrier 7. That is, the table 10 moves in the X-axis direction and the Y-axis direction by the X-axis feed mechanism 9, the Y-axis feed mechanism 8, and the carrier 7. Thus, the workpiece provided on the table 10 moves relative to the tool. The machine tool 1 cuts the workpiece that moves relative to the tool.

The table 10 includes a right cover device 12 on the right side and a left cover device 13 on the left side. The X-axis feed mechanism 9 is exposed to the outside on the right side and left side of the table 10. The right cover device 12 and the left cover device 13 each cover a portion of the X-axis feed mechanism 9 that is exposed to the outside. The right cover device 12 and the left cover device 13 each have a structure in which a plurality of covers, each having a mountain-shaped cross-section, are nested and overlapped. The right cover device 12 and the left cover device 13 each expand and contract in the left and right direction, i.e., the X-axis direction, in accordance with the movement of the table 10.

The carrier 7 includes a front cover device 14 on the front side and a rear cover device (not shown) on the rear side. The Y-axis feed mechanism 8 is exposed to the outside on the front side and rear side of the table 10. The front cover device 14 and the rear cover device each cover the portion of the Y-axis feed mechanism 8 that is exposed to the outside. The front cover device 14 has a structure in which a plurality of covers, each having a mountain-shaped cross-section, are nested and overlapped. The front cover device 14 expands and contracts in the front and rear direction, i.e., the Y-axis direction, in accordance with the movement of the carrier 7 in the Y-axis direction. The rear cover device is a metal plate having a mountain-shaped cross-section. The rear cover device moves along with the carrier 7 in the Y-axis direction. When the carrier 7 moves to the column 5 side, the column 5 houses the rear cover device inside the lower part.

The protective cover 25 and the lower cover 50 will be described with reference to FIG. 2 and FIG. 4 to FIG. 6. The protective cover 25 and the lower cover 50 are protective members that prevent chips generated during machining from adhering to the moving mechanism of the Z-axis. The protective cover 25 includes a fixed cover 30 and a moving cover 40.

The fixed cover 30 is a metal plate with bent edges and has a substantially rectangular shape when viewed from the front. The upper end part 31 of the fixed cover 30 is bent forward. The upper end part 31 has a screw hole for fixing to the lower part of the main shaft head 6 with a screw. The side end parts 32 on both the left and right sides of the fixed cover 30 are bent rearward. The side end parts 32 position the moving cover 40 in the left and right direction and guides the up and down movement of the moving cover 40. The center of the lower end part 33 of the fixed cover 30 in the left and right direction is positioned higher than the two ends. Thus, when the main shaft head 6 descends, the fixed cover 30 avoids interference with the mountain-shaped rear cover device at the lower end part 33. Furthermore, the lower end part 33 has a notched part 34 substantially in the center in the left and right direction. The notched part 34 is notched in an upward trapezoidal shape.

The fixed cover 30 has a pair of fixing holes 36 at a position closer to the lower end part 33 than the center in the up and down direction. The fixing holes 36 are formed at positions spaced apart from each other in the left and right direction. A pair of guiding screws 35 are fixed to the pair of fixing holes 36, respectively. The guiding screws 35 fastened to the fixing holes 36 protrude rearward from the fixed cover 30. The guiding screws 35 are respectively provided in a pair of guiding holes 41 of the moving cover 40.

A spacer 27 is made of metal and has a cylindrical shape, and is fitted into each of the pair of guiding screws 35. The spacers 27 may rotate in the circumferential direction of the guiding screws 35. Elastic members 28 are annular and are provided around the outer circumference of the spacers 27. The elastic members 28 are made of resin and are elastic. Examples of the elastic members 28 include urethane, nitrile rubber, and fluoro rubber. The elastic members 28 may have a smaller Young's modulus than the moving cover 40 described below and may have greater elasticity than the moving cover 40. The elastic members 28 are provided so as to surround the guiding screws 35 via the spacers 27. By providing the spacers 27 between the elastic members 28 and the guiding screws 35, the elastic members 28 may rotate in the circumferential direction of the guiding screws 35. The elastic members 28 are provided in the guiding holes 41. Thus, the outer circumference surfaces of the elastic members 28 face the inner circumference surfaces of the guiding holes 41 of the moving cover 40.

The fixed cover 30 has a plurality of projecting parts 37 on the back surface 30A. The back surface 30A is the surface facing the moving cover 40. The projecting parts 37 are provided in a region of the back surface 30A of the fixed cover 30 that overlaps the moving cover 40 in the front and rear direction when the moving cover 40 is positioned at the lowest position of the movement range (see FIG. 4). The projecting parts 37 are provided at a distance from each other. The projecting parts 37 form a portion that is doweled on the back surface 30A side by pressing the fixed cover 30 (see the cross-section taken along line I-I in FIG. 5). The projecting parts 37 form a gap D between the back surface 30A of the fixed cover 30 and the front surface 40A of the moving cover 40. Thus, the projecting parts 37 prevent the back surface 30A from sticking to the front surface 40A. The tip end part of the projecting part 37 has a hemispherical shape. Thus, the contact area between the projecting parts 37 and the front surface 40A is small.

The moving cover 40 is a resin plate. An example of the moving cover 40 is polyvinyl chloride (PVC). The moving cover 40 has a substantially rectangular shape that is long in the left and right direction when viewed from the front. The length of the moving cover 40 in the left and right direction is slightly shorter than that of the fixed cover 30. The length of the moving cover 40 in the up and down direction is ½ to ⅓ of that of the fixed cover 30. The moving cover 40 has a pair of guiding holes 41. The guiding holes 41 are long hole-shape openings in the up and down direction and penetrate the moving cover 40 in the front and rear direction. The positions of the guiding holes 41 in the left and right direction correspond to the positions of the fixing holes 36 in the fixed cover 30. The upper end part and the lower end part of the guiding hole 41 are circular. The radius of curvature of the upper end part and the lower end part of the guiding hole 41 is larger than the radius of the outer circumferential portion of the elastic member 28. Thus, the length of the guiding hole 41 in the left and right direction is greater than the diameter of the elastic member 28. Thus, the moving cover 40 is allowed to move in the left and right direction with respect to the fixed cover 30. The side end parts 32 of the fixed cover 30 position the side end parts 42 on both the left and right sides of the moving cover 40. There is a slight gap between the side end parts 32 and side end parts 42 in the left and right direction. Thus, the moving cover 40 may move in the left and right direction with respect to the fixed cover 30 within the range of the gap.

The lower end part 43 of the moving cover 40 has a notched part 44. The notched part 44 has a shape in which a substantially center in the left and right direction is notched upward. When the main shaft head 6 descends, the notched part 44 engages with engagement projections 55A and 55B of the lower cover 50. Inclined parts 44A and 44B are provided in the notched part 44. The inclined parts 44A and 44B are side parts that connect the upper end part of the notched part 44 to the bottom part of the notched part 44 on both the left and right sides. The inclined parts 44A and 44B are each inclined in a direction that widens the notched part 44 downward. The engagement projections 55A and 55B engage with the inclined parts 44A and 44B, respectively.

The moving cover 40 is provided on the back surface side of the fixed cover 30. A pressing plate 26 is provided on the back surface side of the moving cover 40. The pressing plate 26 extends in the left and right direction. The pressing plate 26 has through holes at two end parts. The guiding screws 35 are inserted from the rear of the moving cover 40 via through holes of the pressing plate 26 into the guiding holes 41. The guiding screws 35 are fastened to the fixing holes 36 with the spacers 27 and the elastic members 28 placed in the guiding holes 41. A gap is provided between the pressing plate 26 and the moving cover 40. A gap is provided between the fixed cover 30 and the moving cover 40 due to the projecting parts 37. Thus, the moving cover 40 is capable of moving up and down relatively with respect to the fixed cover 30.

The lower cover 50 is plate-shaped and longer than the protective cover 25 in the left and right direction. The upper end part 51 of the lower cover 50 has an extension part 51A extending upward. The extension part 51A is wider than the notched part 44 of the moving cover 40 in a front view. When the main shaft head 6 rises, the extension part 51A prevents the Z-axis rails 21 and the column 5 from being exposed from the notched part 44 of the moving cover 40. A lower end part 53 of the lower cover 50 has a notched part 54. The notched part 54 has a shape in which the center in the left and right direction is notched in a mountain-shape on the upper side. The rear cover device of the Y-axis feed mechanism 8 is provided in the notched part 54. The lower cover 50 has a pair of engagement projections 55A and 55B above the notched part 54. The engagement projections 55A and 55B are made of resin, elastic, and are cylindrical. Examples of the engagement projections 55A and 55B include urethane, nitrile rubber, and fluoro rubber. The engagement projections 55A and 55B may have a smaller Young's modulus than the moving cover 40 and may have greater elasticity than the moving cover 40. The engagement projections 55A and 55B are fixed to the front surface of the lower cover 50 with screws 56. The engagement projections 55A and 55B are provided at positions that abut against the inclined parts 44A and 44B of the notched part 44 of the moving cover 40, respectively, when the main shaft head 6 descends.

The operations of the fixed cover 30 and the moving cover 40 will be described with reference to FIG. 2, FIG. 4, FIG. 7, and FIG. 8. As shown in FIG. 2, the upper end part 31 of the fixed cover 30 is fixed to the lower part of the main shaft head 6 with a screw.

The moving cover 40 moves downward relatively with respect to the fixed cover 30 due to its own weight. The moving cover 40 moves downward to a position where the upper end parts of the guiding holes 41 abut against the elastic members 28 provided around the guiding screws 35. The side end parts 42 of the moving cover 40 is positioned at the side end parts 32 of the fixed cover 30 in the left and right direction. Thus, the moving cover 40 moves while allowing positional deviation within the range of the gap between the side end parts 32 and the side end parts 42 in the left and right direction. The protective cover 25 has a gap D defined by the projecting parts 37 between the back surface 30A of the fixed cover 30 and the front surface 40A of the moving cover 40. Thus, the moving cover 40 does not stick to the fixed cover 30 and moves smoothly.

Figure 4:
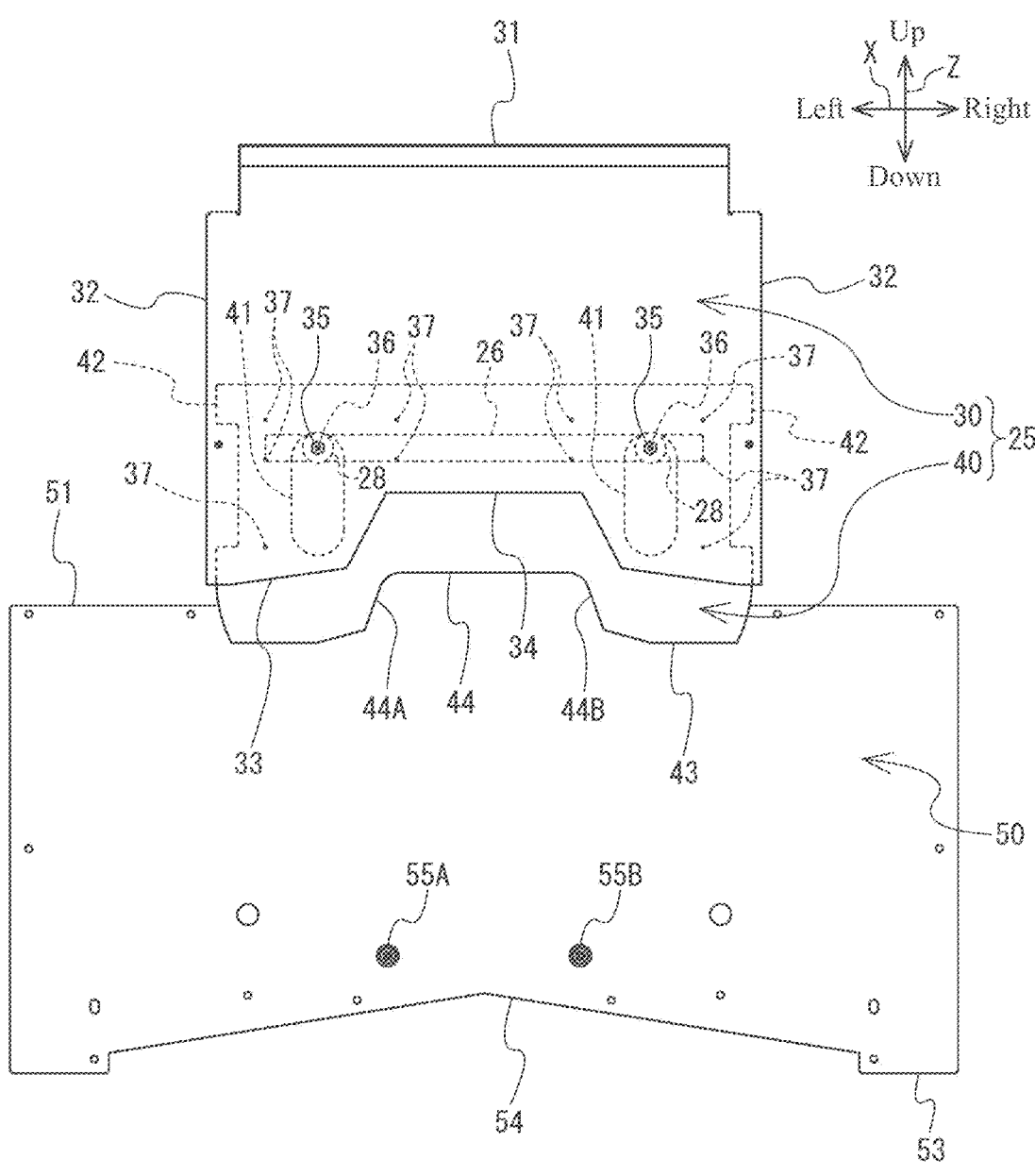
FIG. 4 is a front view of the protective cover 25 and the lower cover 50 when the main shaft head 6 is positioned at the uppermost end of the movement range.
Figure 5:
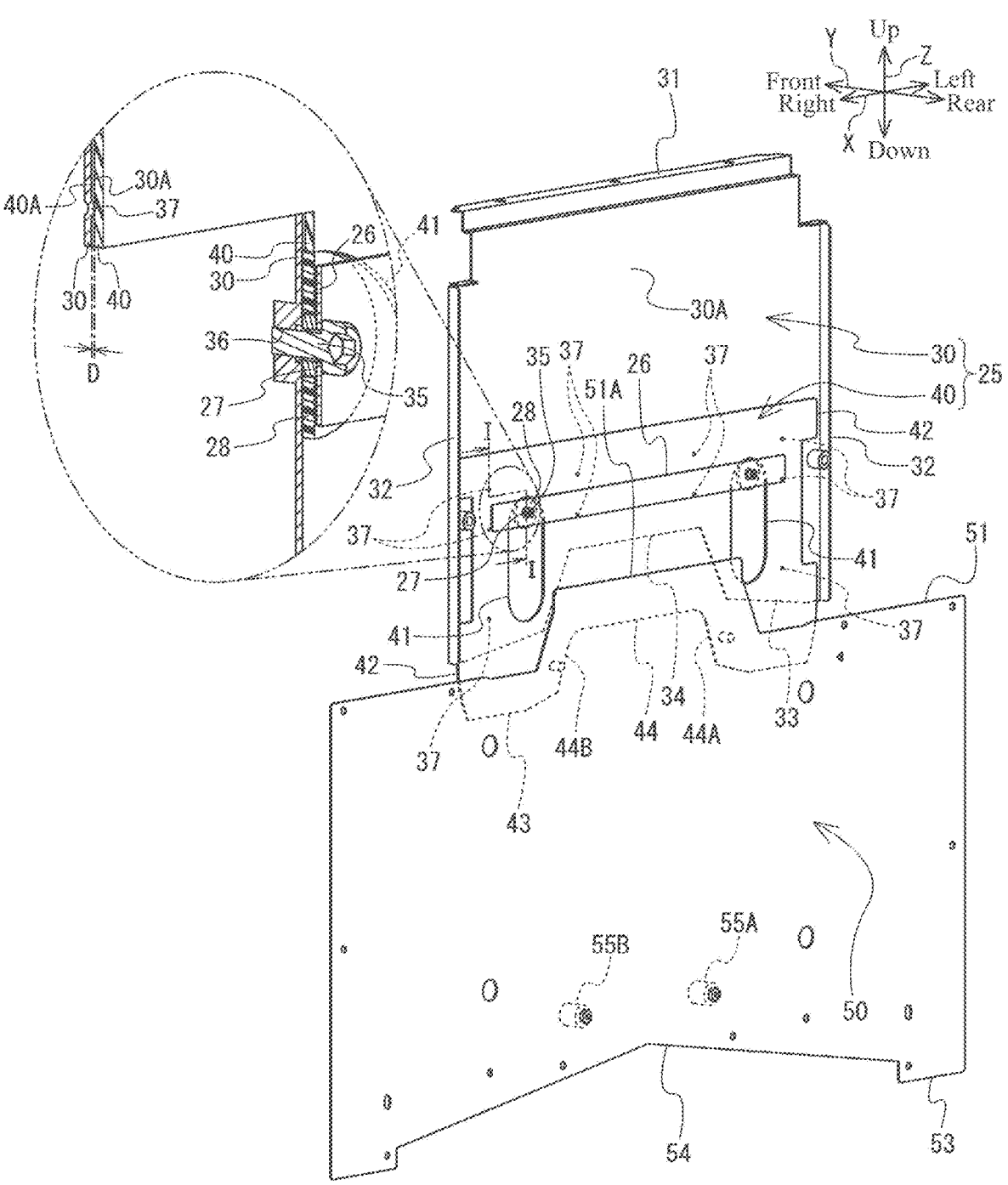
FIG. 5 is a rear perspective view of the protective cover 25 and the lower cover 50.
Figure 6:
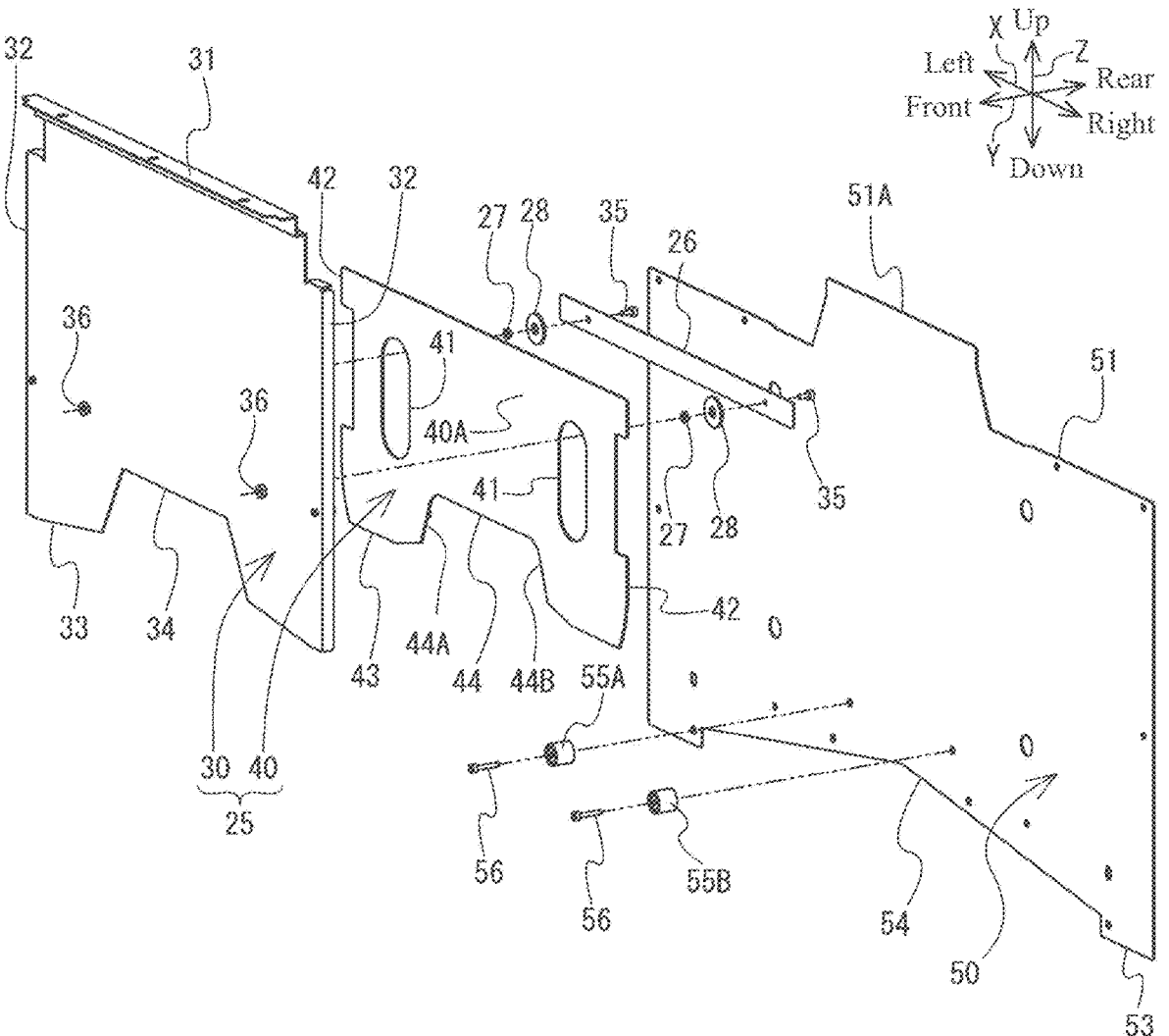
FIG. 6 is an exploded perspective view of the protective cover 25 and the lower cover 50.

As shown in FIG. 4, the elastic members 28 provided around the guiding screws 35 abut against the upper end parts of the guiding holes 41 and limit the downward movement of the moving cover 40. The elastic members 28 are elastically deformed to mitigate the impact of the collision between the upper end parts of the guiding holes 41 and the guiding screws 35. The radius of the elastic members 28 is smaller than the radius of curvature of the upper end parts of the guiding holes 41. Thus, the elastic members 28 come into contact with the upper end parts of the guiding holes 41 over a wide range when being elastically deformed. Thus, the fixed cover 30 holds the moving cover 40 more securely at the lowest point of the movement range of the moving cover 40. The elastic members 28 are provided around the guiding screws 35 via the spacers 27 and are freely rotatable. Thus, the contact positions of the elastic members 28 with the upper end parts of the guiding holes 41 changes in a circumferential direction. Thus, since the impact applied to the elastic members 28 may be dispersed in the entire circumferential direction, the durability life of the elastic members 28 may be extended. A substantially lower half portion of the moving cover 40 in the up and down direction is exposed from the lower end part 43 of the fixed cover 30.

When the main shaft head 6 moves to the uppermost position within the movable range, the fixed cover 30 covers the front surface of the column 5. In the case where the movement range of the main shaft head 6 is larger than in the conventional case, when the main shaft head 6 is positioned at the uppermost end, portions of the column 5 and the Z-axis rails 21 are exposed from the lower end part 33 of the fixed cover 30. A substantially lower half portion of the moving cover 40 is positioned below the lower end part 33 of the fixed cover 30. The moving cover 40 covers a portion of the column 5 and the Z-axis rails 21 exposed from the fixed cover 30. Thus, the protective cover 25 protects the moving mechanism provided on the column 5 from chips and the like during machining. The moving cover 40 is positioned rearward of the fixed cover 30. Thus, the guiding holes 41 are positioned behind the fixed cover 30 and are not exposed on the front surface side. Thus, the fixed cover 30 prevents chips and the like from entering the guiding holes 41 during machining.

Figure 7:
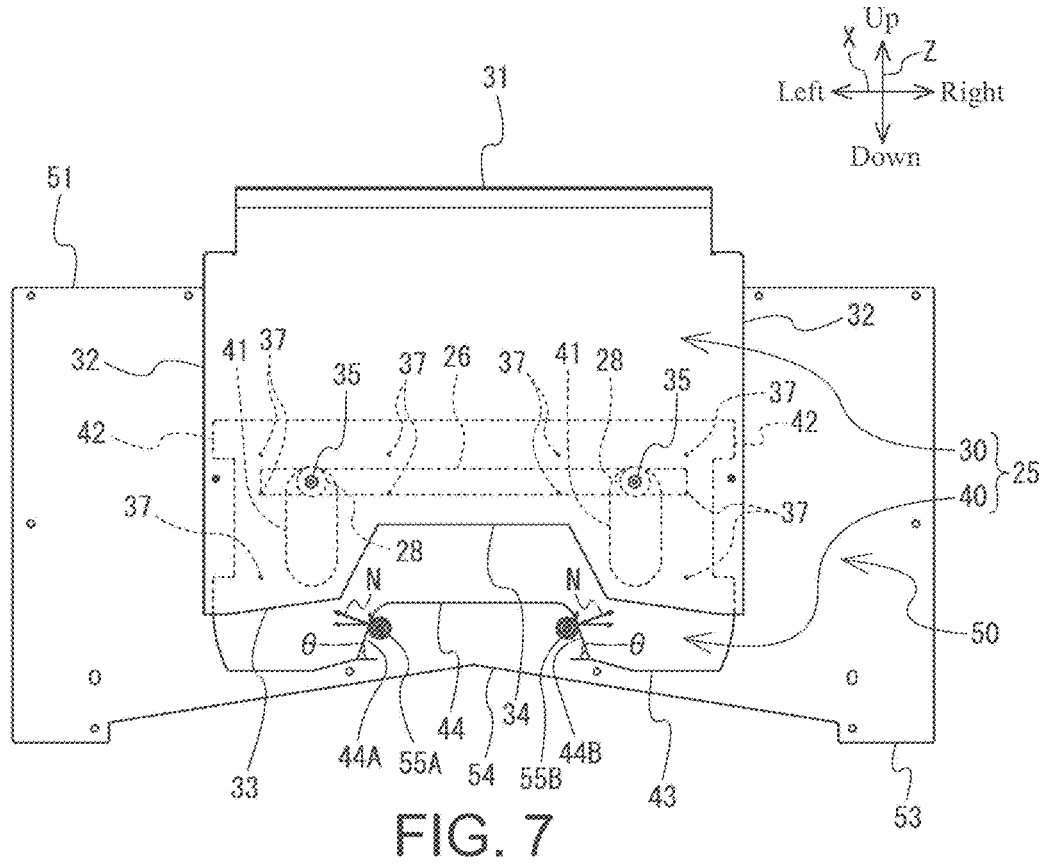
FIG. 7 is a front view of the protective cover 25 and the lower cover 50 when the main shaft head 6 is on the way of descending.

When the main shaft head 6 moves downward in the Z-axis direction, the moving cover 40 maintains a state in which it is at the lowermost movable position with respect to the fixed cover 30 by its own weight. As shown in FIG. 7, in the process of the main shaft head 6 descending, the inclined parts 44A and 44B of the notched part 44 of the moving cover 40 abut against the engagement projections 55A and 55B of the lower cover 50. The inclined parts 44A and 44B abut against the engagement projections 55A and 55B at the inclined surfaces that are inclined with respect to the up and down direction. The inclined surface of the inclined part 44A is inclined at an angle $\theta$ with respect to the horizontal direction. The direction perpendicular to the inclined surface of the inclined part 44A points toward the lower right. The inclined surface of the inclined part 44B is inclined at an angle $\theta$ with respect to the horizontal direction. The direction perpendicular to the inclined surface of the inclined part 44B points toward the lower left. When the inclined parts 44A and 44B abut against the engagement projections 55A and 55B, the inclined parts 44A and 44B receive a drag N from the engagement projections 55A and 55B in the direction perpendicular to the inclined surfaces. The inclined part 44A receives a force of $N \sin \theta$ in the left direction as the horizontal component of the drag N. The inclined part 44B receives a force of $N \sin \theta$ in the right direction as the horizontal component of the drag N. Thus, the horizontal component of the drag N that the moving cover 40 receives is cancelled out. The inclined parts 44A and 44B receive a force of N cos θ in the upward direction as a vertical component of the drag N. θ is less than 90 degrees. Thus, compared to the case where the inclined surfaces are not inclined and are horizontal planes, the inclined parts 44A and 44B may reduce the drag N that the moving cover 40 receives when it abuts against the engagement projections 55A and 55B and may mitigate the impact. The engagement projections 55A and 55B are elastic. By elastically deforming the engagement projections 55A and 55B at the time of a collision, the moving cover 40 may further mitigate the impact at the time of the collision. Thus, the moving cover 40 is restricted from bouncing in the upward direction.

Figure 8:
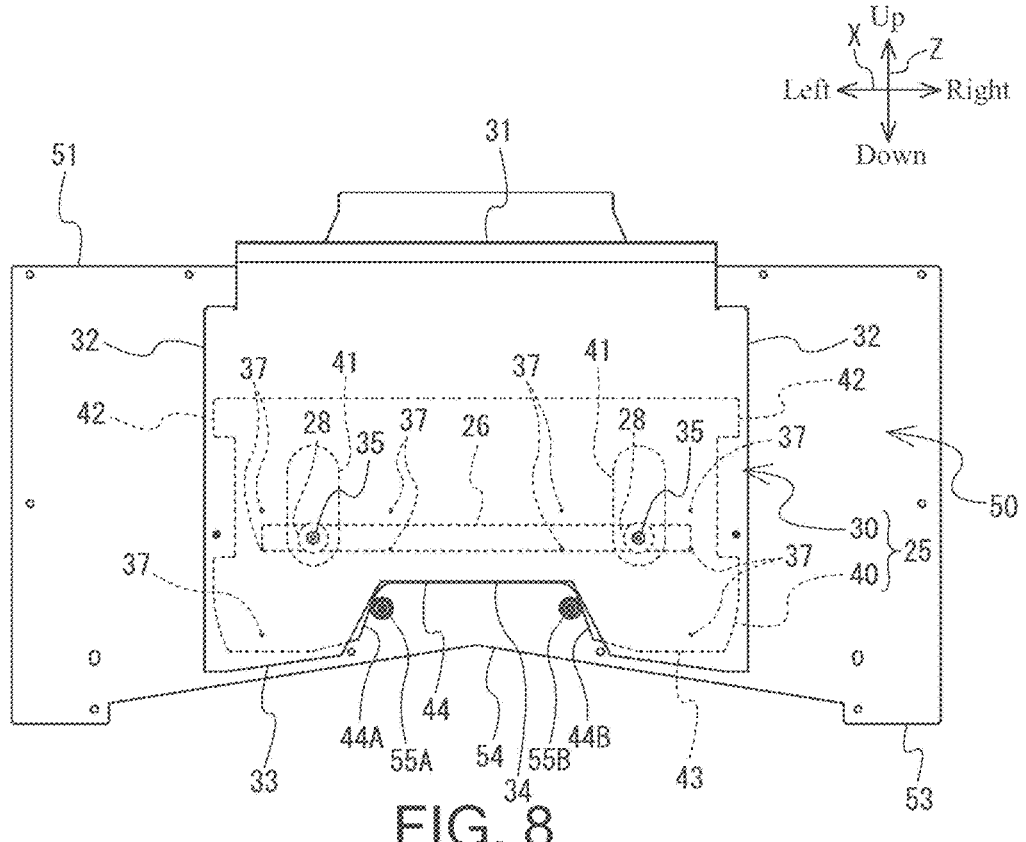
FIG. 8 is a front view of the protective cover 25 and the lower cover 50 when the main shaft head 6 is positioned at the lowermost end of the movement range.

As shown in FIG. 8, even if the main shaft head 6 further descends from the state shown in FIG. 7, the moving cover 40 maintains the state in which the inclined parts 44A and 44B abut against the engagement projections 55A and 55B. While the main shaft head 6 descends, the moving cover 40 does not move in the up and down direction. The lower end part 43 of the moving cover 40 has a small gap between it and the rear cover device of the Y-axis feed mechanism 8 and does not abut against the rear cover device. The fixed cover 30 moves downward relatively with respect to the moving cover 40. On the back surface side of the fixed cover 30, the moving cover 40 moves upward relatively with respect to the fixed cover 30. Thus, the moving cover 40 does not hinder the downward movement of the fixed cover 30. The position of the lowermost end of the main shaft head 6 is determined by controlling the drive of the Z-axis motor 23. When the main shaft head 6 is at the lowermost position within the movable range, the position of the lower end part 33 of the fixed cover 30 is controlled to a position with a small gap between it and the rear cover device of the Y-axis feed mechanism 8. Thus, the fixed cover 30 does not abut against the rear cover device. The notched part 34 does not contact the engagement projections 55A and 55B. The lower end part 43 of the moving cover 40 is at substantially the same height as the lower end part 33 of the fixed cover 30. The moving cover 40 moves upward relatively with respect to the fixed cover 30 and is housed on the back surface side of the fixed cover 30. Thus, the moving cover 40 does not hinder the downward movement of the fixed cover 30.

As described above, the fixed cover 30 covers the portion where the Z-axis rails 21 and the column 5 are exposed on the front surface of the column 5 as the main shaft head 6 moves in the axial direction of the main shaft 4. When the main shaft head 6 moves downward, the fixed cover 30 approaches the base 2. When the main shaft head 6 moves upward and the protective cover 25 moves away from the base 2, the fixed cover 30 does not completely cover the front surface, and the Z-axis rails 21 and the column 5 are exposed. The moving cover 40 moves relatively with respect to the fixed cover 30. The moving cover 40 covers the portion of the Z-axis rails 21 and the column 5 exposed that is not completely covered by the fixed cover 30. Thus, the fixed cover 30 and the moving cover 40 prevent chips generated when the material is machined by the tool from adhering to the Z-axis rails 21 and the column 5. In addition, the protective cover 25 is a structure in which the fixed cover 30 is fixed to the main shaft head 6 and the moving cover 40 moves with respect to the fixed cover 30, and therefore may be produced at low cost.

When the main shaft head 6 moves upward and the protective cover 25 moves away from the base 2, the moving cover 40 moves downward with respect to the fixed cover 30 due to its own weight. In this case, the guiding screws 35 is guided into the guiding holes 41, so that the moving cover 40 may be reliably moved with respect to the fixed cover 30.

The fixed cover 30 is located closer to the table 10 side where the material is machined than the moving cover 40. Thus, the fixed cover 30 prevents chips generated when the material is machined by the tool from entering the guiding holes 41 of the moving cover 40.

The moving cover 40 may move more reliably in the axial direction of the main shaft 4 with respect to the fixed cover 30 by the guide of the side end parts 32.

When the main shaft head 6 moves upward and the protective cover 25 moves away from the base 2, the moving cover 40 moves downward with respect to the fixed cover 30 due to its own weight. The guiding holes 41 of the moving cover 40 move downward with respect to the guiding screws 35 of the fixed cover 30. When the guiding screws 35 approach the upper end parts of the guiding holes 41, the elastic members 28 provided around the guiding screws 35 are sandwiched between the guiding screws 35 and the upper end parts of the guiding holes 41. The elastic members 28 are elastically deformed, and the contact area with the guiding screws 35 and the upper end parts of the guiding holes 41 increases. As a result, the elastic members 28 may reduce the stress applied to the fixed cover 30 due to the movement of the moving cover 40 by its own weight, and the durability of the moving cover 40 may be increased. In addition, the elastic members 28 may mitigate the impact that would occur when the guiding screws 35 and the end parts of the guiding holes 41 collide in the case where the elastic members 28 are not present.

When the elastic members 28 having an annular shape are sandwiched between the guiding screws 35 and the end parts of the guiding holes 41, the elastic members 28 may reliably come into contact with the end parts and undergo elastic deformation, regardless of the relative positional deviation between the guiding holes 41 and the guiding screws 35 or the shape of the end parts of the guiding holes 41. Thus, the elastic members 28 may more reliably mitigate the impact when the fixed cover 30 and the moving cover 40 collide.

By providing the spacers 27 between the elastic members 28 and the guiding screws 35, the elastic members 28 may rotate with respect to the guiding screws 35. When the elastic members 28 are sandwiched between the guiding screws 35 and the upper end parts of the guiding holes 41, the impact applied to the elastic members 28 is not concentrated in a specific portion but is dispersed over the entire circumferential direction as the elastic members 28 rotate. Thus, the elastic members 28 have a longer service life and may mitigate the impact of a collision between the fixed cover 30 and the moving cover 40 for a long period of time.

The lower cover 50 is fixed to the column 5 closer to the base 2 than the protective cover 25, and includes engagement projections 55A and 55B. When the main shaft head 6 descends, the moving cover 40 approaches the base 2. The moving cover 40 engages with the engagement projections 55A and 55B without contacting other structures. The engagement projections 55A and 55B come into contact with the moving cover 40 and are elastically deformed, thereby mitigating the impact during a collision.

When the main shaft head 6 descends, the engagement projections 55A and 55B abut against the inclined parts 44A and 44B of the notched part 44 formed on the moving cover 40. The inclined parts 44A and 44B are inclined with respect to the Z-axis direction. Thus, the drag N applied to the moving cover 40 due to the contact with the engagement projections 55A and 55B is dispersed in the Z-axis direction and a direction perpendicular to the Z-axis direction. That is, the drag N applied to the moving cover 40 in the Z-axis direction when it abuts against the engagement projections 55A and 55B is reduced. Thus, the engagement projections 55A and 55B may further mitigate the impact applied to the moving cover 40 in the Z-axis direction. Thus, the moving cover 40 may suppress the bouncing movement in the Z-axis direction due to the drag N when the inclined parts 44A and 44B abut against the engagement projections 55A and 55B.

The projecting parts 37 provided on the back surface 30A of the fixed cover 30 come into contact with the front surface 40A of the moving cover 40, thereby forming a gap D between the back surface 30A and the front surface 40A. That is, the opposing surfaces of the fixed cover 30 and the moving cover 40 do not come into direct contact with each other due to the gap D formed by the projecting parts 37. Thus, the moving cover 40 is unlikely to adhere to the fixed cover 30, and the relative movement of the moving cover 40 with respect to the fixed cover 30 is not hindered.

In the above embodiment, the front surface of the column 5 corresponds to the "one side surface" of the disclosure. The main shaft head 6 corresponds to the "support body" of the disclosure. The Z-axis ball screw 22 and the Z-axis rails 21 correspond to the "moving mechanism" of the disclosure. The protective cover 25 corresponds to the "protective member" of the disclosure. The fixed cover 30 corresponds to the "first protective part" of the disclosure. The moving cover 40 corresponds to the "second protective part" of the disclosure. The guiding holes 41 correspond to the "opening" of the disclosure. The guiding screws 35 corresponds to the "protruding part" of the disclosure. The side end parts 32 corresponds to the "guiding part" of the disclosure. The lower cover 50 corresponds to the "third protective part" of the disclosure. The engagement projections 55A and 55B correspond to the "engaging parts" of the disclosure. The inclined parts 44A and 44B correspond to the "inclined edges" of the disclosure. The notched part 44 corresponds to the "notched part" of the disclosure. The back surface 30A of the fixed cover 30 corresponds to the "first surface" of the disclosure. The front surface 40A of the moving cover 40 corresponds to the "second surface" of the disclosure.

The disclosure is not limited to the above embodiment, and various modifications may be made. Although a pair of guiding holes 41 are provided in the moving cover 40, the number of the guiding holes 41 may be one, or three or more. When there is one guiding hole 41, the moving cover 40 may reliably move in the up and down direction by being guided by the side end parts 32 of the fixed cover 30. When there are two or more guiding holes 41, the side end parts 32 of the fixed cover 30 may be omitted. The pressing plate 26 may be omitted. Washers having an outer diameter larger than the radius of curvature of the guiding holes 41 may be attached to the guiding screws 35 and used in place of the pressing plate 26. The notched part 34 of the fixed cover 30 may be omitted. The notched part 44 of the moving cover 40 may be formed into a pair of V-shapes including inclined parts 44A and 44B corresponding to the engagement projections 55A and 55B. In this case, the engagement projection 55A and the inclined part 44A are provided at the center in the left and right direction, and the engagement projection 55B and the inclined part 44B may be omitted.

The projecting parts 37 are not limited to being formed by doweling, but may be formed by being screwed to the back surface 30A of the fixed cover 30, or by fitting a dowel therein. The tip end part of the projecting part 37 does not have to be hemispherical. The projecting part 37 is not limited to a columnar shape, and may have a peak-like protruding shape. The projecting parts 37 may be provided on the front surface 40A of the moving cover 40. The radius of curvature of the end part of the guiding hole 41 may be the same as the radius of the outer circumferential portion of the elastic member 28. The shape of the end part of the guiding hole 41 is not limited to a semicircular shape, but may be a rectangular shape or a trapezoidal shape with chamfered corners. The spacer 27 may be omitted.

Figure 9:
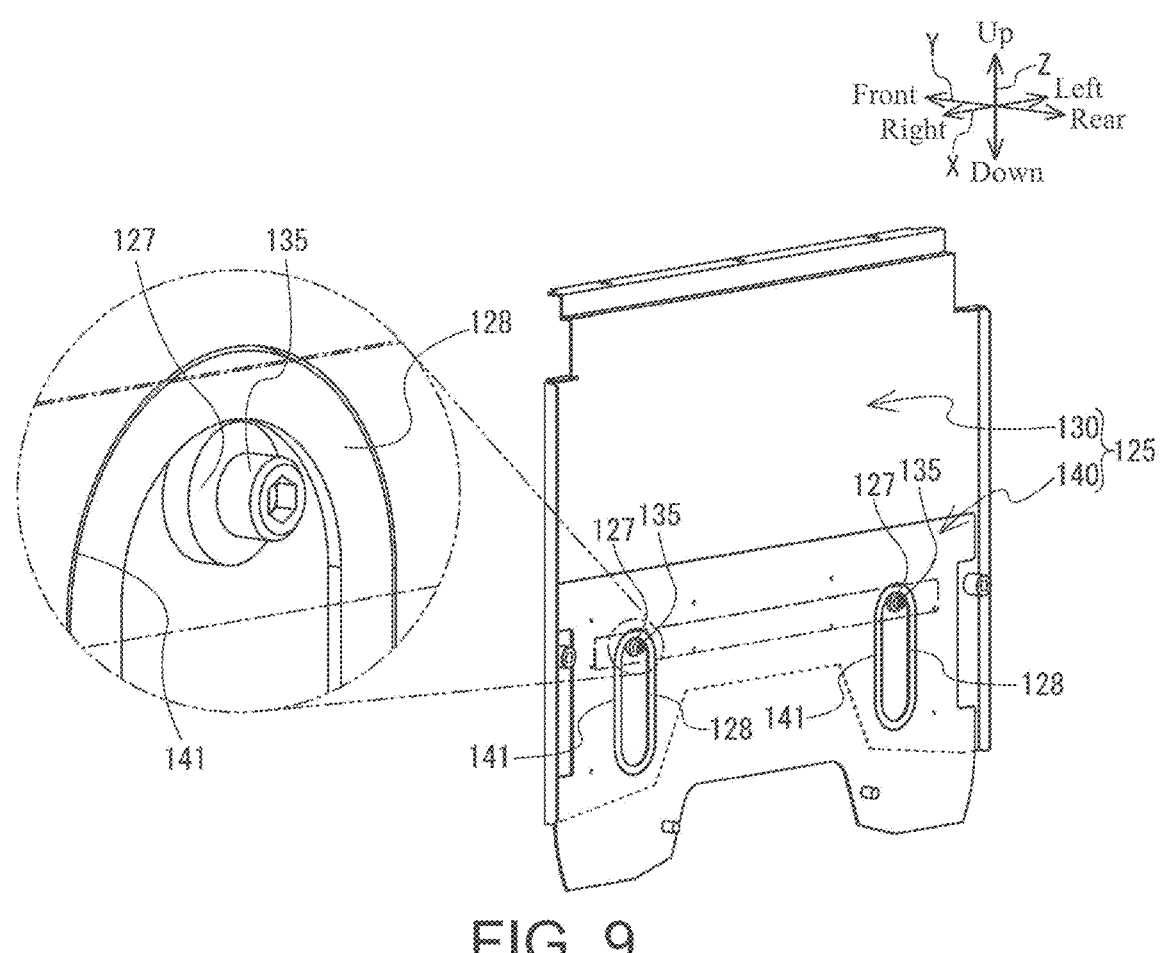
FIG. 9 is a rear perspective view of the protective cover 125.

As shown in FIG. 9, the protective cover 125 may have elastic members 128 formed in an oval annular shape fixed to the inside of the guiding holes 141 of the moving cover 140. In this case, the spacers 127 are formed to be larger than the spacers 27 of this embodiment. The spacers 127 are provided around the guiding screws 135 which are fastened to the fixed cover 130. The radius of the outer circumferential part of the spacer 127 is set smaller than the radius of curvature at the end part of the inner circumferential portion of the elastic member 128. With this configuration, the guiding screws 135 may contact the guiding holes 141 via the elastic members 128. Thus, the elastic members 128 may mitigate the impact during a collision. In the above case, the spacers 127 may be omitted. The elastic member 128 is not limited to an annular shape, and may be provided only at the upper end part of the guiding hole 141, or may be provided at both the upper end part and the lower end part.

Figure 10:
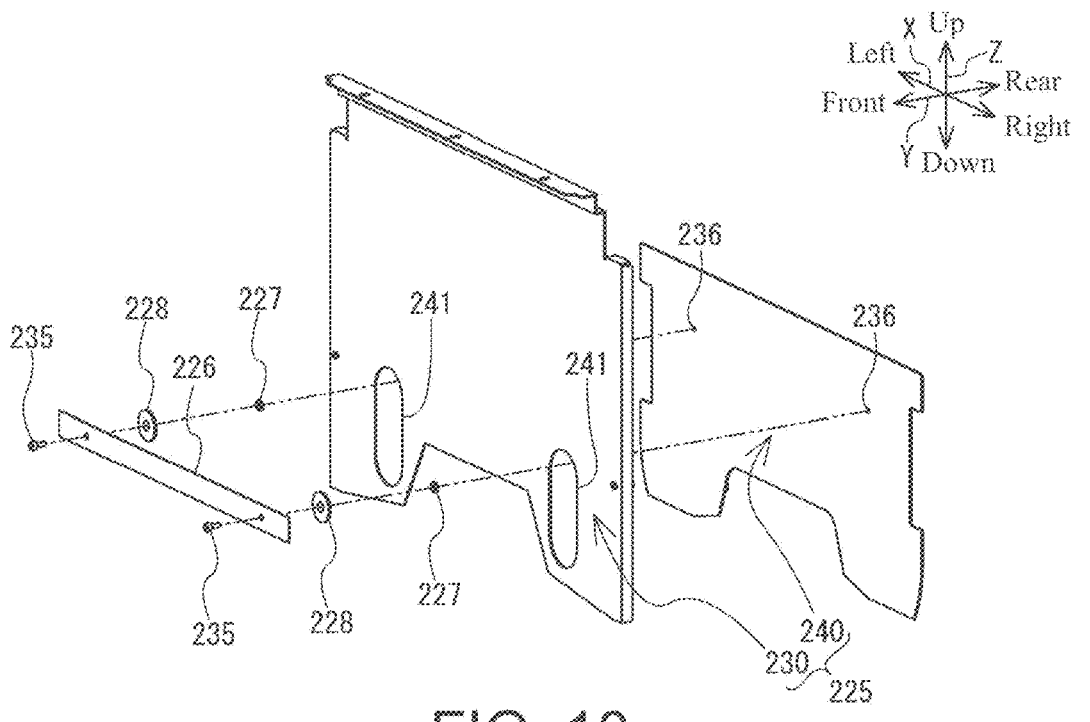
FIG. 10 is an exploded perspective view of the protective cover 225.

As shown in FIG. 10, the protective cover 225 may have guiding holes 241 formed on the fixed cover 230 and guiding screws 235 provided on the moving cover 240. The guiding screws 235 are inserted from the front side of the pressing plate 226 through the through holes at the two end parts into the guiding holes 241. The guiding screws 235 are fastened to the fixing holes 236 of the moving cover 240 with the spacers 227 and the elastic members 228 provided in the guiding holes 241. Even with this configuration, the moving cover 240 may move in the up and down direction relatively with respect to the fixed cover 230. The guiding holes 241 open on the front surface of the fixed cover 230. Thus, a cover that covers the guiding holes 241 may be provided on the front surface of the fixed cover 230 to prevent chips and the like from entering the guiding holes 241 during machining. In this case, instead of the pressing plate 226, washers having an outer diameter larger than the radius of curvature of the guiding holes 241 may be attached to the guiding screws 235.

Figure 11:
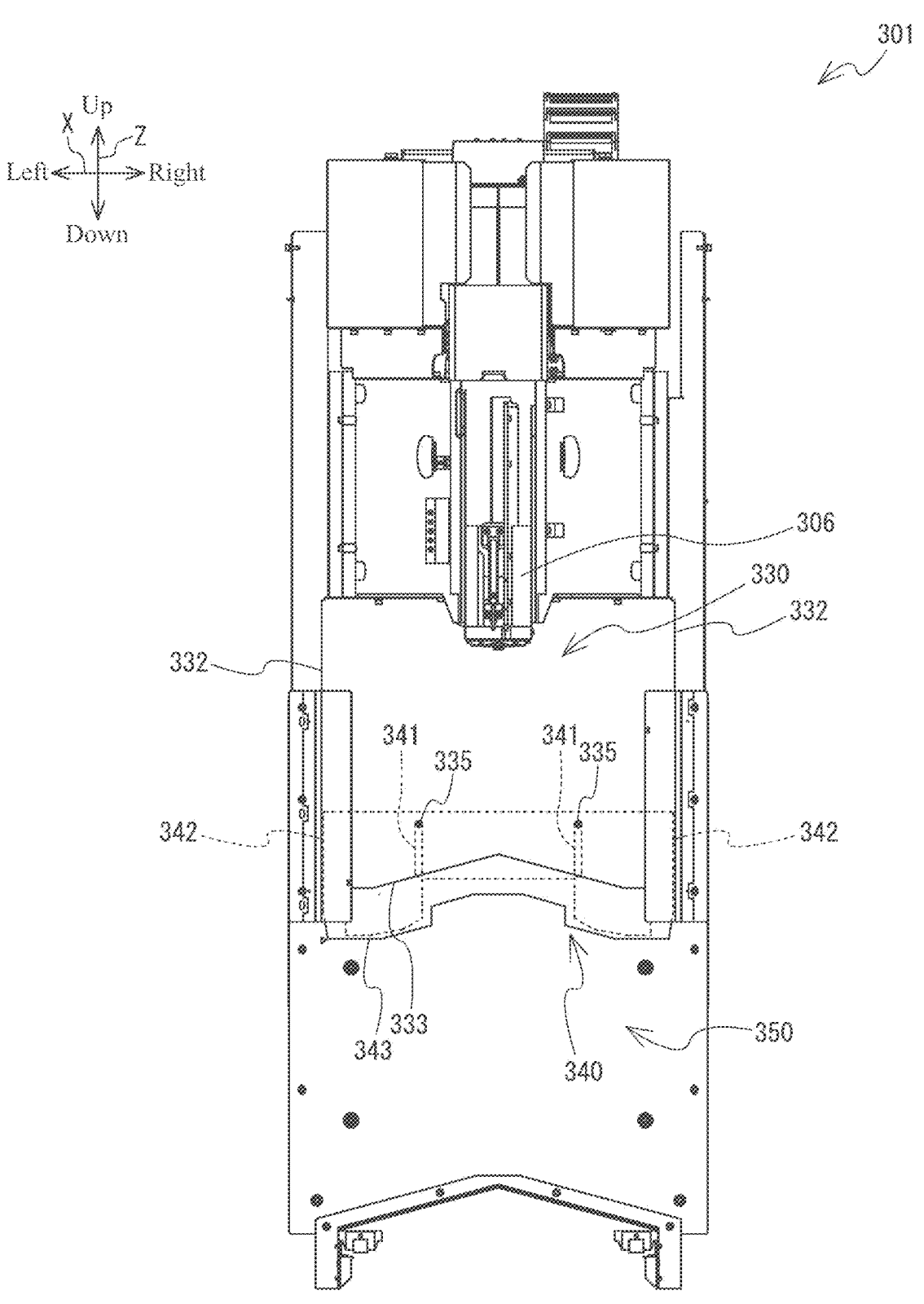
FIG. 11 is a front view of the column when the main shaft head 306 is at the uppermost end in the Z-axis direction.
Figure 12:
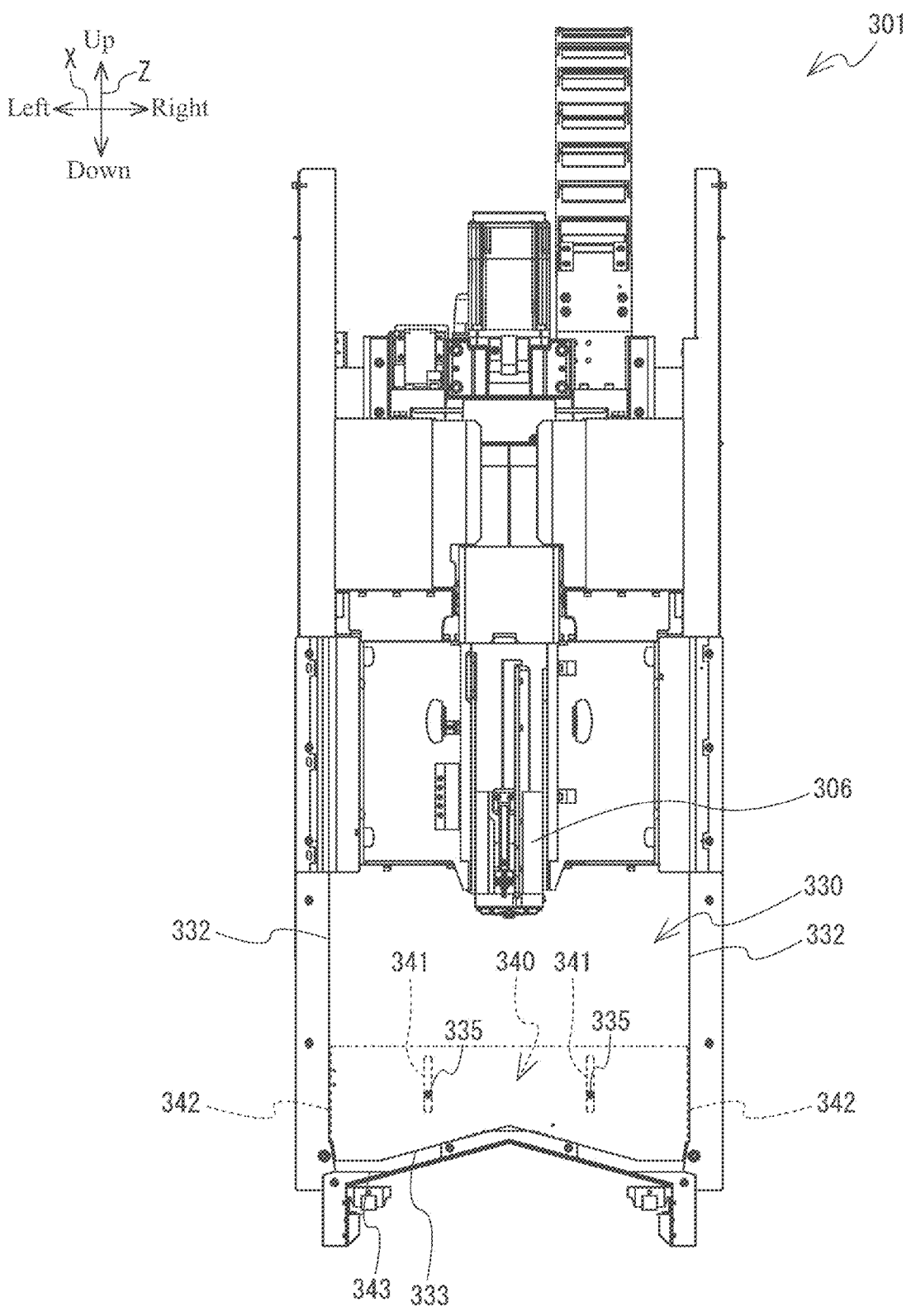
FIG. 12 is a front view of the column when the main shaft head 306 is at the lowermost end in the Z-axis direction.

As shown in FIG. 11, the lower cover 350 of the machine tool 301 does not have to include an engagement projection. As shown in FIG. 12, when the main shaft head 306 is at the lowermost position within the movable range, the position of the lower end part 333 of the fixed cover 330 is controlled to a position having a small gap between it and the cover device of the Y-axis feed mechanism. Thus, the fixed cover 330 does not abut against the cover device. The lower end part 343 of the moving cover 340 is located below the lower end part 333 of the fixed cover 330 and abuts against the cover device. In this way, the moving cover 340 moves upward relatively with respect to the fixed cover 330 and is housed on the back surface side of the fixed cover 330. Thus, the moving cover 340 does not hinder the downward movement of the fixed cover 330. In addition, compared with the case where the fixed cover 330 made of metal collides with the cover device, the moving cover 340 made of resin suppresses the impact noise and impact generated by the collision with the cover device.

Figure 13:
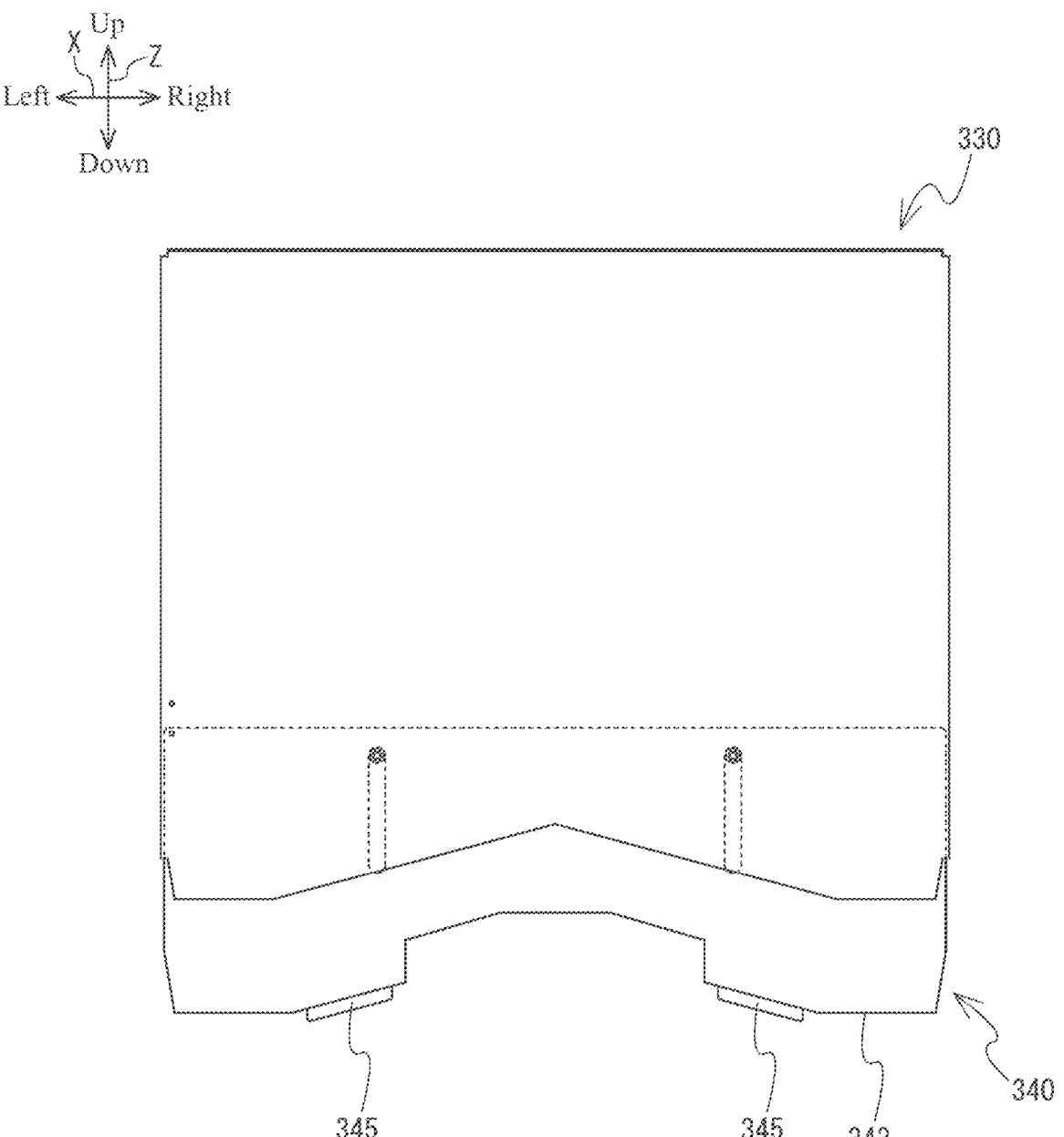
FIG. 13 is a front view of the fixed cover 330 to which the moving cover 340 having the rubber feet 345 is attached.

Furthermore, as shown in FIG. 13, the moving cover 340 may have a lower end part 343 provided with an elastic buffer material such as rubber feet 345. In this case, the moving cover 340 may be made of metal. When the main shaft head 306 moves near the lower end of the movement range, the rubber feet 345 of the moving cover 340 abut against the cover device on the base 2. The rubber feet 345 may suppress noise and impact generated upon contact by elastically deforming.

In addition, the guiding screws 335 of the fixed cover 330 does not need to be provided with an elastic member or a spacer surrounding the outer periphery. In this case, the width of the guiding holes 341 in the left and right direction are slightly larger than the outer diameter of the guiding screws 335, and it is desirable that there be a slight gap between the guiding holes 341 and the guiding screws 335 in the left and right direction so that the guiding holes 341 and the guiding screws 335 may move smoothly. Furthermore, the side end parts 332 on both the left and right sides of the fixed cover 330 guide the side end parts 342 on both the left and right sides of the moving cover 340. Thus, the moving cover 340 may move straighter downward in the up and down direction.

Figure 14:
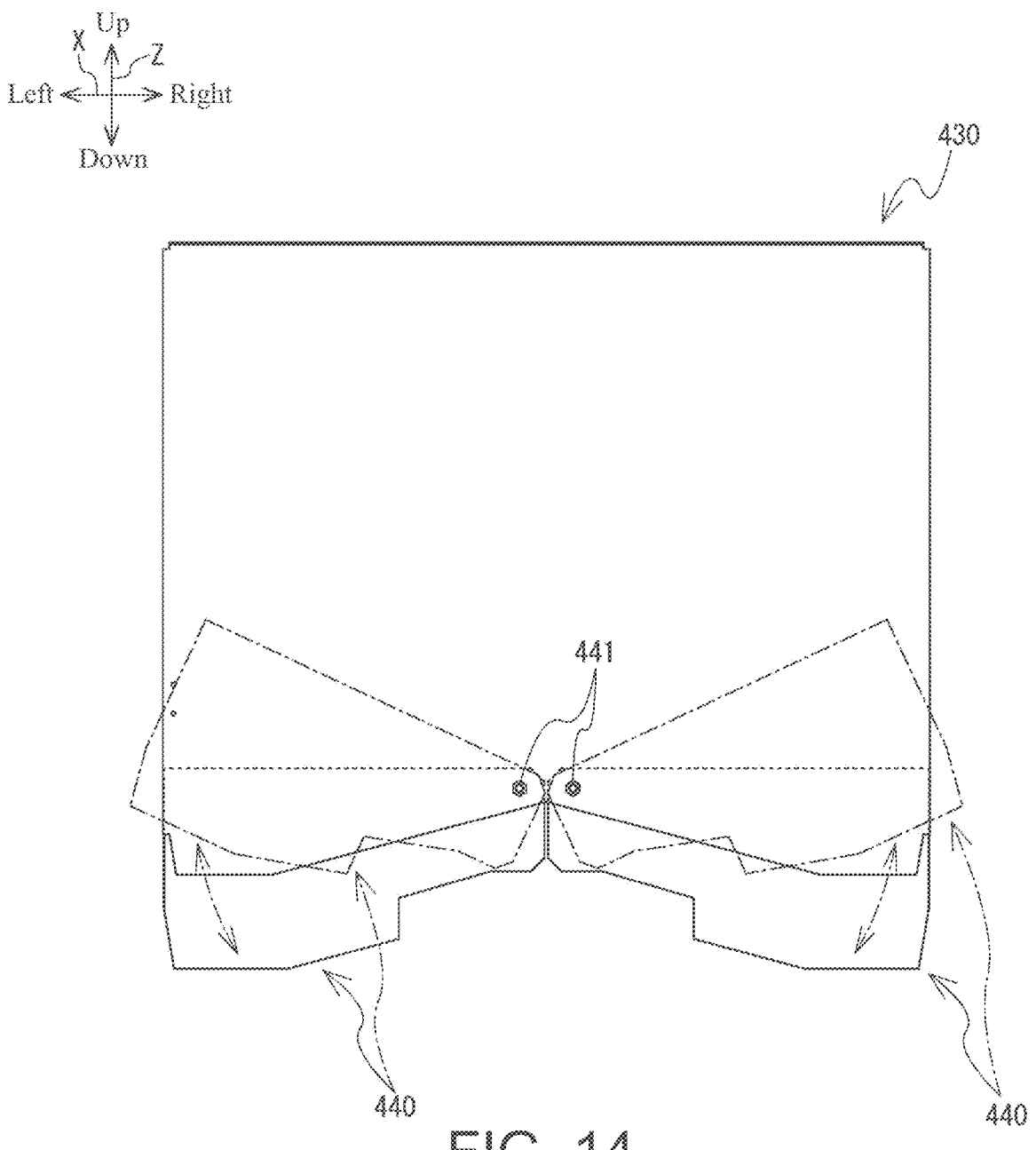
FIG. 14 is a front view of the fixed cover 430 to which rotating moving covers 440 are attached.

As shown in FIG. 14, the moving cover 440 does not have to move in the up and down direction relatively with respect to the fixed cover 430. For example, the moving cover 440 may be provided so as to be rotatable about a rotary shaft 441 provided near the center of the fixed cover 430 in the left and right direction. A pair of moving covers 440 are provided, and rotate by their own weight between a position where they are housed on the back surface of the fixed cover 430 and a position where they are exposed from the fixed cover 430. When the main shaft head descends, the pair of moving covers 440 abut against the cover device and rotate in a direction in which both the left and right end parts move upward, thereby being housed on the back surface side of the fixed cover 430. When the main shaft head rises, the pair of moving covers 440 rotate under their own weight in a direction in which both the left and right ends move downward, and are exposed from the fixed cover 430. The pair of movable covers 440 may be positioned in a shape that protects the inside of the column by abutting each other at the center in the left and right direction.

What is claimed is:

1. A machine tool, comprising:
a base;
a column, provided on the base;
a main shaft, configured to mount a tool detachably;
a support body, provided on one side surface of the column and supporting the main shaft;
a moving mechanism, provided on the column and configured to move the support body in an axial direction of the main shaft; and
a protective member, covering a portion of the one side surface of the column where the moving mechanism is exposed as the support body moves;
wherein the protective member comprises:
a first protective part, fixed to the support body and moved in the axial direction along with the support body by the moving mechanism; and
a second protective part, moving relatively with respect to the first protective part on a side opposite to the support body of the first protective part,
wherein the second protective part is configured to move downward relatively with respect to the first protective part due to its own weight,
wherein the first protective part or the second protective part has projecting parts on any one of a first surface where the first protective part faces the second protective part and a second surface where the second protective part faces the first protective part, and the projecting parts project toward the other surface and have projecting tips that contact the other surface.

2. The machine tool according to claim 1, wherein
one of the first protective part and the second protective part has an opening extending in the axial direction, and
the other of the first protective part and the second protective part has a protruding part that protrudes into the opening and is movable in the axial direction relatively with respect to the opening.

3. The machine tool according to claim 2, wherein the second protective part has the opening and is provided closer to the moving mechanism side than the first protective part.

4. The machine tool according to claim 3, wherein the first protective part has a guiding part that guides a movement of the second protective part in the axial direction.

5. The machine tool according to claim 4, wherein the protective member has an elastic member that is elastic provided in the protruding part or the opening.

6. The machine tool according to claim 5, wherein the elastic member is formed in an annular shape surrounding a periphery of the protruding part.

7. The machine tool according to claim 6, wherein
the protective member has a spacer provided between the protruding part and the elastic member, and
the elastic member is rotatable in a circumferential direction with respect to the protruding part.

8. The machine tool according to claim 7, comprising:
a third protective part, fixed to the column closer to the base side than the protective member; and
engaging parts, provided on the third protective part and engaged with the second protective part when the support body moves in the axial direction to a direction approaching the third protective part, and
the engaging parts being elastic.

9. The machine tool according to claim 8, wherein:
a notched part that is notched on a side away from the base and has inclined edges that are inclined with respect to the axial direction in a portion where the notched part is formed at an end part of the second protective part on the base side in the axial direction, and
the engaging parts abut against the inclined edges of the notched part when the support body moves in the axial direction to a direction approaching the third protective part.

10. A protective member for a machine tool, the machine tool comprising: a base; a column, provided on the base; a main shaft, configured to mount a tool detachably; a support body, provided on one side surface of the column and supporting the main shaft; and a moving mechanism, provided on the column and configured to move the support body in an axial direction of the main shaft, wherein the protective member covers and protects a portion of the one side surface of the column of the machine tool where the moving mechanism is exposed as the support body moves, the protective member comprises:
a first protective part, fixed to the support body and moved in the axial direction along with the support body by the moving mechanism; and
a second protective part, moving relatively with respect to the first protective part,
one of the first protective part and the second protective part has an opening extending in the axial direction, and
the other of the first protective part and the second protective part has a protruding part that protrudes into the opening and is movable in the axial direction relatively with respect to the opening.

11. The protective member according to claim 10, comprising an elastic member that is elastic provided in the protruding part or the opening.

* * * * *